3,346,640
PREPARATION OF MONOALKYLAMINES AND DIALKYLAMINES
August Guyer and Pio Guyer, Zurich, Switzerland, assignors to Lonza Ltd., Basel, Switzerland
No Drawing. Filed July 21, 1964, Ser. No. 384,241
Claims priority, application Switzerland, July 24, 1963, 9,195/63
7 Claims. (Cl. 260—583)

This invention relates to the preparation of monoalkyl amines and dialkylamines.

It is known to convert, by hydroamination, aliphatic aldehydes into the corresponding monoalkylamines; in accordance with this method, an aldehyde is mixed with ammonia, the resulting mixture is vaporized and reacted in the vapor phase with hydrogen in the presence of a hydrogenation catalyst. The reaction is strongly exothermic; especially in the reaction of lower molecular aldehydes such as acetaldehyde, always an aldol reaction takes place as a side reaction whereby undesirable resins are formed as byproducts which affect the efficiency of the hydrogenation catalyst.

Also the vaporising of the aldehyde-ammonia mixture diminishes the selectivity of the reaction.

It is also known to produce amines by first dissolving aldehyde and ammonia or amine, with at least one unsubstituated hydrogen atom at the nitrogen atom, in alcohol thereby forming the corresponding aldehyde-addition product and subjecting the latter without isolation from the solvent to the hydrogenation reaction with hydrogen in presence of a hydrogenation catalyst. However, the selective conduit of this reaction is difficult and furthermore the process impaired by the usual disadvantages due to the use of solvents.

We have found that by forcing the aldehyde in an excess of liquid anhydrous ammonia at room temperature concentrated solutions of aldehyde-ammonia can be produced which are very stable also at higher temperatures.

We have also found that in presence of liquid ammonia the condensation of the aldehyde with monoalkylamines is almost completely suppressed in favour of the aldehyde-ammonia formation. If such solutions are hydrogenated while maintained in the liquid phase the corresponding monoalkylamines and dialkylamines are formed with high selectivity and in substantially quantitative yields.

The working in liquid ammonia, respectively mixtures of liquid ammonia and monoalkylamines has the great advantage that the intermediary occurring very unstable alkylideneimines are formed only under hydrogenating conditions and immediately reacted with hydrogen to form the monoalkylamines, respectively reacted with monoalkylamines and hydrogenated to dialkylamines.

By removing the heat of formation during the first step, e.g. while forming the aldehyde-ammonia less heat is freed in the hydrogenating reactor. The presence of liquid ammonia in the reactor has furthermore the arvantage to allow continuous removal of reaction heat produced by the subsequent reactions by evaporating of ammonia.

In this manner local overheatings are avoided and it becomes possible to convert the aldehyde into monoalkylamines and dialkylamines with greater selectivity and better space-time-yields as it was heretofore possible with the known methods in that by the presence of the ammonia and the constancy of temperatures in the reaction body, the disproportionation and the formation of trialkylamines are substantially restrained.

Due to the absence of organic solvents the action of ammonia is not diminished and the recovery of the amines by distillation is very simple and economic.

Therefore, the process of the invention for the preparation of monoalkylamines and dialkylamines consists in forcing first an aldehyde into a reaction medium consisting of a member, selected from a group, comprising liquid anhydrous ammonia and a mixture of liquid anhydrous ammonia with a monoalkylamine, in the molar ratio aldehyde to the selected member of the group consisting of liquid anhydrous ammonia and a mixture of liquid anhydrous ammonia and a monoalkylamine of 1:2 to 15 and at temperatures from 0 to 40° C. thereby forming an aldehyde-ammonia solution, reacting and hydrogenating while maintaining said solution in liquid phase under hydrogen pressure and in the presence of a hydrogenation catalyst and finally recovering the produced amine.

The process of the invention is particularly suitable for the preparation of lower primary and secondary aliphatic amines from the corresponding aliphatic aldehydes with 2 to 6 carbon atoms in the molecule such as n-propion-aldehyde, butyraldehyde, and preferably acetaldehyde. The amines used in the mixture with liquid ammonia are preferably the alkylamines with 2 to 6 atoms of carbon in the molecule such as ethylamine, propylamine, butylamine.

As the liquid ammonia, respectively the mixture ammonia-alkylamine is not only a starting material but serves also as reaction medium, its amount must be adjusted to ensure a good control of the temperature during the reaction; we use 2 to 15, preferably 3 to 8, moles of ammonia, respectively of mixture ammonia-monoalkylamine per mole of aldehyde.

For the selective preparation of monoalkylamines the aldehyde shall be pressed into liquid ammonia alone, whereby the ratio of aldehyde to ammonia shall be preferably selected between 1:3 to 8.

If substantially only dialkylamine is to be produced, the mixture of ammonia and monoalkylamine to to be adjusted in such a manner that after the reaction of aldehyde and ammonia to aldehyde-ammonia is completed a large excess of monoalkylamine to ammonia is present in the reaction body (reaction medium). Preferably the molar ratio in the mixture ammonia and monoalkylamine is 1:1.3 to 4. It is preferred, when the process is carried out continuously, to introduce the aldehyde into the mixture ammonia and monoalkylamine in the molar ratio of 1 mole aldehyde to 1.5 to 2.5 moles ammonia and 2 to 5 moles monoalkylamine. If besides dialkylamines it is desired to make also monoalkylamines this can be done by increasing the quantity of ammonia in the mixture.

The formation of the aldehyde-ammonia is carried out at temperatures of 0 to 40° C., preferably 15 to 25° C., whereby the pressure must be sufficient to maintain the anhydrous ammonia in the liquid state. According to the temperature, said pressure is between 5 and 15 atm.

The aldehyde-ammonia in liquid phase is converted to the amine by hydrogenation under pressure. For this purpose, the aldehyde-ammonia dissolved in liquid ammonia, respectively in the mixture of liquid ammonia and monoalkylamine, is treated with hydrogen in presence of a hydrogenation catalyst.

While maintaining the liquid phase, said hydrogenation is carried out at a total pressure in excess of 40 atm., preferably in the range of 100 to 200 atm., the total pressure being adjusted in such a way as to allow evaporation of ammonia when the temperature rises. Temperatures in the range of 70 to 220° C., preferably between 140 to 180° C., are employed.

The hydrogenation in liquid ammonia is carried out in the presence of any one of the well known hydrogenation catalysts, for example cobalt, nickel, platinum, palladium, in suitable form, preferably on a carrier like pumice, active carbon, or the like.

The preparation of the aldehyde-ammonia as well as the hydrogenation may be carried out as a batch process or continuously, for instance in a stirring autoclave or also in a flow pipe.

According to a preferred embodiment of the process of the invention the selective preparation of dialkylamines is carried out in a cyclic process. In this case the aldehyde is forced into a mixture containing ammonia and alkylamine in the ratio of 1 mole aldehyde to 1.5 to 2.5 moles ammonia and 2 to 5 moles monoalkylamine at a temperature of 0 to 40° C., thereby forming an aldehyde-ammonia solution in liquid ammonia and monoalkylamine then reacting and hydrogenating while maintaining said solution in liquid phase under a hydrogen pressure of at least 40 atm. and at a temperature of 70 to 220° C. in the presence of a hydrogenation catalyst, withdrawing the unreacted ammonia and monoalkylamine by distillation, returning said ammonia and said monoalklamine after liquefaction into the cycle and finally recovering the dialkylamine from the distillation residue.

The following examples are submitted to illustrate and not to limit the invention.

EXAMPLE 1

2 moles of acetaldehyde are forced at about 20° C. and a pressure of 9 atm. into a water cooled reactor containing 16 moles of anhydrous liquid ammonia. The obtained solution of acetaldehyde ammonia in liquid ammonia is continuously pumped over a precipitated nickel catalyst and hydrogenated with hydrogen at 120° C. at a pressure of 150 atm. At a residence time of about 2 min., the acetaldehyde ammonia is converted with a 100% yield into a mixture of 97.5 percent by weight of monoethylamine and 2.5 percent by weight of diethylamine, which mixture is recovered after reducing the pressure to 10 atm. removing the ammonia.

EXAMPLE 2

1 mole of propionaldehyde is pumped under a pressure of 8 atm. at 10° C. with vigorous stirring and cooling (water) into 7 moles of liquid anhydrous ammonia. The obtained solution of propionaldehyde-ammonia in liquid ammonia is then pumped into a hydrogenation reactor where it is hydrogenated at 100° C. and a hydrogen-ammonia pressure of 150 atm. on a nickel-kieselguhr catalyst. The formed amine is recovered as described in Example 1. The yield of monopropylamine is 99% of theory.

EXAMPLE 3

A run similar to that described in Example 1 was made with 1 mole of butyraldehyde and 10 moles of anhydrous liquid ammonia. Monobutylamine was obtained in a yield of 98%.

EXAMPLE 4

4 moles of acetaldehyde were forced at a temperature of 25° C. into 14.4 moles of liquid ammonia contained in a stirring autoclave. The obtained aldehyde-ammonia containing solution was then passed continuously at 160° C. and a total ammonia-hydrogen pressure of 150 atm. over a granulated nickel-kieselguhr catalyst. The rate of flow of the solution was 3 liter of solution per hour and liter of catalyst. After releasing the pressure to atmospheric pressure, the reaction product was recovered. Analysis confirmed complete conversion of the acetaldehyde to an amine mixture consisting of 97% of monoethylamine and 3% of diethylamine.

EXAMPLE 5

3 moles acetaldehyde are slowly forced under cooling into a mixture of 7.8 moles monoethylamine and 4.8 moles ammonia at a temperature of 25° C. and under a pressure of 5 atm. The obtained solution of aldehyde-ammonia in the liquid mixture of monoalkylamine and ammonia is then continuously passed over a granulated nickel-precipitation catalyst and hydrogenated with hydrogen under a pressure of 200 atm. at a temperature of 175° C. After a residence time of a few minutes the aldehyde-ammonia is substantially completely converted into diethylamine and monoethylamine after half of the intermediary occurring ethylideneimine has first reacted with monoethylamine and then with hydrogen the other half being directly hydrogenated. The flow rate of the solution is of 4 kilograms acetaldehyde-ammonia per hour and liter catalyst. After lowering the pressure to 10 atm. the unreacted ammonia and monoethylamine are distilled off and returned into the cycle. From the residue 93% by weight of diethylamine and 5% by weight triethylamine based on the introduced acetaldehyde are recovered.

We claim:

1. A process for the preparation of monoalkylamines and dialkylamines comprising forcing first and aliphatic aldehyde into a reaction of liquid anhydrous ammonia or a mixture of liquid anhydrous ammonia with a monoalkylamine in the molar ratio aldehyde to liquid anhydrous ammonia or a mixture of liquid anhydrous ammonia and a monoalkylamine of 1:2 to 15 and at a temperature in the range of 0 to 40° C., thereby forming an aldehyde-ammonia solution, then reacting and hydrogenating with hydrogen while maintaining said solution in liquid phase under a hydrogen pressure of at least 40 atmospheres and a temperature of 70 to 220° C. in the presence of a hydrogenation catalyst, and finally recovering the obtained alkylamine.

2. A process as claimed in claim 1 wherein said aldehyde-ammonia is formed at a temperature of 15 to 25° C.

3. A process as claimed in claim 1 wherein 3 to 8 moles of ammonia or a mixture of ammonia and a monoalkylamine are employed per mole of aldehyde.

4. A process as claimed in claim 1 wherein the components of the mixture of ammonia and monoalkylamine are in molar ratio of 1:1.3 to 4.

5. A process as claimed in claim 1 wherein the hydrogenation is carried out at a pressure of 100 to 200 atmospheres.

6. A process as claimed in claim 1 wherein the hydrogenation is carried out at a temperature of 140 to 180° C.

7. A cyclic process for the continuous preparation of dialkylamines from aldehydes, ammonia, monoalkylamines and hydrogen comprising forcing first and aliphatic aldehyde into a mixture containing 1.5 to 2.5 moles ammonia and 2 to 5 moles monoalkylamine per mole of aldehyde at a temperature of 0 to 40° C. thereby forming the aldehyde-ammonia solution in liquid anhydrous ammonia and monoalkylamine, then reacting and hydrogenating while maintaining said solution in liquid phase under a hydrogen pressure of at least 40 atmospheres and at a temperature of 70 to 220° C. in the presence of a hydrogenation catalyst, withdrawing the unreacted ammonia and monoalkylamine by distillation, returning said ammonia and said monoalkylamine after liquifaction into the cycle and finally recovering the dialkylamine from the distillation residue.

References Cited

UNITED STATES PATENTS 2,686,811   8/1954   Bull _____ 260—585

CHARLES B. PARKER, *Primary Examiner.*

R. L. RAYMOND, *Assistant Examiner.*